(12) United States Patent
Zhang

(10) Patent No.: US 10,826,380 B2
(45) Date of Patent: Nov. 3, 2020

(54) SWITCHING CONVERTER, CIRCUIT AND METHOD FOR CONTROLLING THE SAME

(71) Applicant: SILERGY SEMICONDUCTOR TECHNOLOGY (HANGZHOU) LTD, Zhejiang (CN)

(72) Inventor: Xiaoling Zhang, Zhejiang (CN)

(73) Assignee: SILERGY SEMICONDUCTOR TECHNOLOGY (HANGZHOU) LTD, Zhejiang (CN)

(*) Notice: Subject to any disclaimer, the term of this patent is extended or adjusted under 35 U.S.C. 154(b) by 0 days.

(21) Appl. No.: 16/456,351

(22) Filed: Jun. 28, 2019

(65) Prior Publication Data

US 2020/0014293 A1  Jan. 9, 2020

(30) Foreign Application Priority Data

Jul. 3, 2018  (CN) .......................... 2018 1 0720717

(51) Int. Cl.
  *H02M 1/14* (2006.01)
  *H02M 3/156* (2006.01)
  *H02M 1/00* (2006.01)

(52) U.S. Cl.
  CPC ............. *H02M 1/14* (2013.01); *H02M 3/156* (2013.01); *H02M 2001/0025* (2013.01)

(58) Field of Classification Search
  CPC ....... H02M 3/158; H02M 3/155; H02M 3/156
  USPC .................. 323/271, 282–285, 288, 299
  See application file for complete search history.

(56) References Cited

U.S. PATENT DOCUMENTS

| 7,714,547 | B2* | 5/2010 | Fogg .................. H03K 4/50 323/224 |
| 9,343,965 | B2 | 5/2016 | Yuan |
| 9,374,007 | B2* | 6/2016 | Shiina .................. H02M 3/158 |
| 9,455,632 | B1 | 9/2016 | Hsieh et al. |
| 9,755,521 | B2 | 9/2017 | Cai et al. |
| 9,941,792 | B2 | 4/2018 | Jing et al. |
| 10,020,738 | B2 | 7/2018 | Cai et al. |
| 2010/0123446 | A1* | 5/2010 | Cheng ................. H02M 3/1588 323/288 |
| 2015/0188430 | A1 | 7/2015 | Yuan |

(Continued)

FOREIGN PATENT DOCUMENTS

| CN | 103199703 A | 7/2013 |
| CN | 103683869 A | 3/2014 |

(Continued)

OTHER PUBLICATIONS

English translation CN107171536 (Year: 2017).*

(Continued)

*Primary Examiner* — Nguyen Tran
(74) *Attorney, Agent, or Firm* — Harness, Dickey & Pierce, P.L.C.

(57) ABSTRACT

A switching converter, a circuit for controlling the same and a method for controlling the same. A ripple signal correlated to an input voltage and an on-off state of a power switch of the switching converter is superimposed on a feedback signal of an output voltage, so as to achieve closed-loop control of the output voltage. A dynamic response speed of the switching converter in case of a change of the input voltage is improved, while a switching frequency is kept constant.

15 Claims, 5 Drawing Sheets

(56) References Cited

U.S. PATENT DOCUMENTS

| | | | | |
|---|---|---|---|---|
| 2016/0087528 A1* | 3/2016 | Fogg | ..................... | H02M 3/156 |
| | | | | 323/271 |
| 2016/0172977 A1 | 6/2016 | Cai et al. | | |
| 2017/0201175 A1* | 7/2017 | Chen | ....................... | H02M 1/08 |
| 2017/0288543 A1 | 10/2017 | Jing et al. | | |
| 2017/0338741 A1 | 11/2017 | Cai et al. | | |

FOREIGN PATENT DOCUMENTS

| | | | |
|---|---|---|---|
| CN | 104133975 A | 11/2014 |
| CN | 104485816 A | 4/2015 |
| CN | 106300978 A | 1/2017 |
| CN | 107171536 A | 9/2017 |
| CN | 107276409 A | 10/2017 |

OTHER PUBLICATIONS

First Chinese Office Action regarding Application No. 201810727717.1 dated Jun. 20, 2019. Translation provided by Unitalen Attorneys at Law.

Second Chinese Office Action regarding Application No. 201810720717.1 dated Dec. 2, 2019. English translation provided by Unitalen Attorneys at Law.

\* cited by examiner

US 10,826,380 B2

SWITCHING CONVERTER, CIRCUIT AND METHOD FOR CONTROLLING THE SAME

The present disclosure claims the priority to Chinese Patent Application No. 201810720717.1, titled "SWITCHING CONVERTER, CIRCUIT AND METHOD FOR CONTROLLING THE SAME", filed on Jul. 3, 2018 with China National Intellectual Property Administration, the content of which is incorporated herein by reference.

FIELD

The present disclosure relates to power electronics technology, and particularly, to a switching converter, a circuit for controlling the switching converter, and a method for controlling the switching converter.

BACKGROUND

At present, pulse width modulation control and pulse frequency modulation control are common among many manners to control a switching converter. Constant on-time control is a type of the pulse frequency modulation control, and is widely applied in the switching converter due to an advantage of a quick response in case of a change of a load.

In conventional technology, a ripple signal is generally superimposed on a feedback signal of an output voltage for a closed-loop control of the output voltage, so that a ripple can be used for control even if an equivalent series resistance of an output capacitor is small. A triangular wave signal and a reference signal are generated by using a fixed current source based on an on-off state of a main power switch of a switching converter. The ripple signal is obtained based on a difference between the triangular wave signal and the reference signal. In case of an abrupt change of an input voltage, the ripple signal cannot quickly follow the change of the input voltage, thereby resulting in greater overshoot or drop of the output voltage due to the superimposed ripple signal.

SUMMARY

In view of the above, a switching converter, a circuit for controlling the switching converter, and a method for controlling the switching converter, are provided according to the present disclosure. A ripple signal is generated based on an input voltage and an on-off state of a power switch in the switching converter, and the ripple signal is superimposed on a feedback signal of an output voltage. Thereby, the output voltage is stabilized and a switching frequency is kept constant, in a case that the input voltage varies.

According to a first aspect of an embodiment of the present disclosure, a circuit for controlling a switching converter is provided, including a ripple generation circuit configured to generate a ripple signal based on an input voltage of the switching converter and an on-off state of a power switch in the switching converter, where the ripple signal is superimposed on a feedback signal of an output voltage of the switching converter, to perform a closed-loop control on the output voltage and increase a dynamic response speed of the switching converter.

Preferably, the ripple generation circuit includes: a reference-signal generation circuit, configured to generate a triangular wave signal and a reference signal based on the input voltage and the on-off state of the power switch; and a Ripple superimposition circuit, configured to generate the ripple signal based on the triangular wave signal and the reference signal.

Preferably, the reference-signal generation circuit includes: a first controlled current source, configured to generate, under control of the input voltage of the switching converter, a first controlled current in a first proportion to the input voltage; a first switch, of which a control terminal receives a first pulse signal, where the first pulse signal is determined based on the on-off state of the power switch; a first filter circuit, configured to generate the triangular wave signal based on an on-off state of the first switch and the first controlled current; and a second filter circuit, configured to generate the reference signal based on the triangular wave signal.

Preferably, the first switch is connected in series between the first controlled current source and the first filter circuit.

Preferably, the first filter circuit includes a first resistor and a first capacitor that are connected in parallel between the first switch and a ground reference.

Preferably, the second filter circuit includes a second resistor and a second capacitor, where a first terminal of the second resistor is connected to a common terminal between the first switch and the first capacitor, and a second terminal of the second resistor is connected to a ground reference via the second capacitor in series.

Preferably, the ripple superimposition circuit includes: a second controlled current source under control of a difference between the triangular wave signal and the reference signal; and a third resistor, connected in parallel with the second controlled current source to generate the ripple signal, where a first terminal of the third resistor is connected to the feedback signal, and a second terminal of the third resistor generates a first signal by superimposing the ripple signal and the feedback signal.

Preferably, the circuit further includes a first comparator, where a first terminal of the first comparator receives the first signal, a second terminal of the first comparator receives a referential signal, and the comparator generates a set signal to control switching-on of the power switch.

Preferably, the circuit further includes a ramp generation circuit, configured to generate a ramp signal correlated with the input voltage.

Preferably, the ramp generation circuit includes: a third controlled current source, configured to generate, under control of the input voltage, a second controlled current in a second proportion to the input voltage; a third capacitor, connected in parallel with the second controlled current source to the ground reference; and a second switch, connected in parallel with the third capacitor, where a control terminal of the second switch receives a second pulse signal, and the second pulse signal is determined based on the on-off state of the power switch.

Preferably, the circuit keeps a switching frequency of the switching converter constant in response to a change of the input voltage.

Preferably, the circuit further includes a second comparator, configured to generate a reset signal based on signals outputted by the reference-signal generation circuit and the ramp generation circuit, to control switching-off of the power switch.

According to a second aspect of the present disclosure, a switching converter is provided. The switching converter includes a power stage circuit including at least one power switch, and any of the aforementioned circuits.

According to a third aspect of the present disclosure, a method for controlling a switching converter is provided, including: generating a triangular wave signal and a reference signal based on an input voltage of the switching converter and an on-off state of a power switch of the switching converter; generating a ripple signal based on the triangular wave signal and the reference signal; and superimposing the ripple signal and a feedback signal of the output voltage to generate a first control signal, for controlling the switching converter and increasing a dynamic response speed in response to a change of the input voltage.

Preferably, generating the ripple signal based on the triangular wave signal and the reference signal includes: controlling a current source based on a difference between the triangular wave signal and the reference signal, to generate a ripple current; and converting the ripple current into the ripple signal.

Preferably, the method further includes: generating a ramp signal based on the input voltage and the on-off state of the power switch; comparing the ramp signal with the reference signal to generate a reset signal for controlling switching-off of the power switch; and comparing the first signal with a referential signal to generate a set signal for controlling switching-on of the power switch.

Preferably, the method keeps a switching frequency of the switching converter constant in response to a change of the input voltage.

BRIEF DESCRIPTION OF THE DRAWINGS

Hereinafter embodiments of the present disclosure is described in conjunction with drawings, to make the aforementioned and other objectives, characteristics and advantages of the present disclosure clearer. The drawings are as follows.

DETAILED DESCRIPTION

Figure 1:
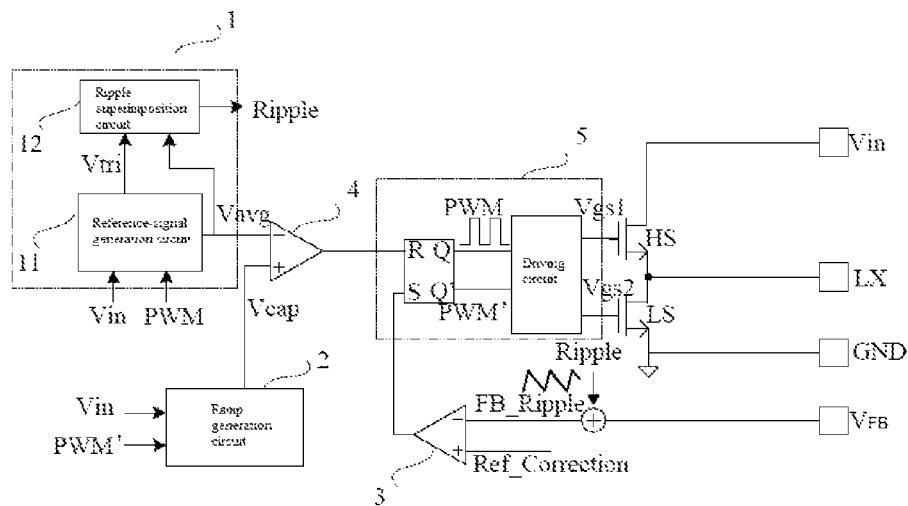
FIG. 1 is a block diagram of a circuit of a switching converter according to an embodiment of the present disclosure.

Embodiments of the present disclosure are described hereinafter. The present disclosure is not limited by the described embodiments. Hereinafter specific detailed parts are fully described in the description of the present disclosure. Those skilled in the art may thoroughly understand the present disclosure without such specific detailed parts. Methods, processes, elements and circuits that are well known by those skilled in the art are not fully described to prevent confusing substantial contents of the present disclosure.

In addition, those skilled in the art should appreciate that the provided drawings are for illustration, and dimensions shown in the drawings may not be drawn to scale.

In addition, it should be appreciated that the wording "circuit" in following description may refer to a conductive loop formed by at least one element or sub-circuit connected electrically or electromagnetically. In a case that an element or a circuit is referred to "connect" to another element or an element/circuit is referred to be "connected" between two nodes, it may be directly coupled or connected to another element, or there may be an intermediate element. Connections between elements may refer to a physical connection, a logical connection, or a combination of the physical connection and the logical connection. In a case that an element is referred to be "directly coupled" or "directly connected" with another element, it means that there is no intermediate element connected between them.

Unless explicitly defined otherwise in context, the terms "include", "comprise" or other similar terms in the whole specification and claims should be interpreted to be inclusive instead of being exclusive or exhaustive. Namely, they should be interpreted to be "including but not being limited to".

It should be appreciated in the description of the present disclosure that the terms "first" and "second" in the descriptions are merely for description, and should not be interpreted as indication or implication of relative importance. In addition, unless defined otherwise, the term "multiple" refers to a quantity of two or more than two in the description of the present disclosure.

FIG. 1 is a block diagram of a circuit of a switching converter according to an embodiment of the present disclosure. The switching converter includes a power stage circuit and a circuit for controlling the switching converter. The power stage circuit is in a buck topology, of which only a main power switch HS and a synchronous power switch LS are illustrated, and an inductor and a capacitor of the power stage circuit are not shown. In one embodiment, one terminal of the inductor is coupled to terminal LX (i.e., a common terminal of power switches HS and LS), the other terminal of the inductor is coupled to an output terminal, and the capacitor is coupled between the output terminal and a ground terminal GND. It can be seen from FIG. 1 that the circuit for controlling the switching converter includes a ripple generation circuit 1, a ramp generation circuit 2, a first comparator 3, a second comparator 4, and a switching-signal generation circuit 5. The ripple generation circuit 1 includes a reference-signal generation circuit 11 and a ripple superimposition circuit 12. The reference-signal generation circuit 11 is configured to generate a triangular wave signal Vtri and a reference signal Vavg based on an input voltage Vin of the switching converter and a pulse signal PWM characterizing an on-off state of the main power switch HS. A first input terminal (for example, an inverting input terminal) of the second comparator 4 can receive the reference signal Vavg. A second input terminal (for example, a non-inverting input terminal) of the second comparator 4 is configured to receive a ramp signal Vcap, generated based on the input voltage Vin and a pulse signal PWM' by the ramp generation circuit 2. The pulse signal PWM' is a signal characterizing an on-off state of the synchronous power switch LS, which is opposite to the on-off state of the main power switch HS. An output terminal of the second comparator 4 outputs a reset signal Reset. The Ripple superimposition circuit 12 generates a ripple signal Ripple based on the triangular wave signal Vtri and the reference signal Vavg, and superimposes the ripple signal Ripple onto a feedback signal $V_{FB}$ to form a first signal FB_Ripple. The feedback signal $V_{FB}$ may characterize an output voltage at the output terminal of the switching converter. An inverting input terminal of the first comparator 3 is configured to receive the first signal FB_Ripple, and a non-inverting input terminal of the first comparator 3 is configured to receive a referential signal Ref_Correction. The referential signal Ref_Correction may characterize an error between the feedback signal $V_{FB}$ and a reference signal, and is a signal compensated by using conventional technology, and a compensation circuit is not shown in the figure. A set signal Set is outputted from an output terminal of the first comparator 3. The switching-signal generation circuit 5 includes an RS flip-flop and a driving circuit. The RS flip-flop receives the reset signal Reset and the set signal Set, respectively, to generate the complementary pulse signals PWM and PWM', and inputs the pulse signals PWM and the PWM' to the driving circuit to generate driving signals Vgs1 and Vgs2 for controlling on-off states of the main power switch HS and the synchronous power switch LS, respectively. Thereby, closed-loop control of the output voltage is achieved.

Figure 2:
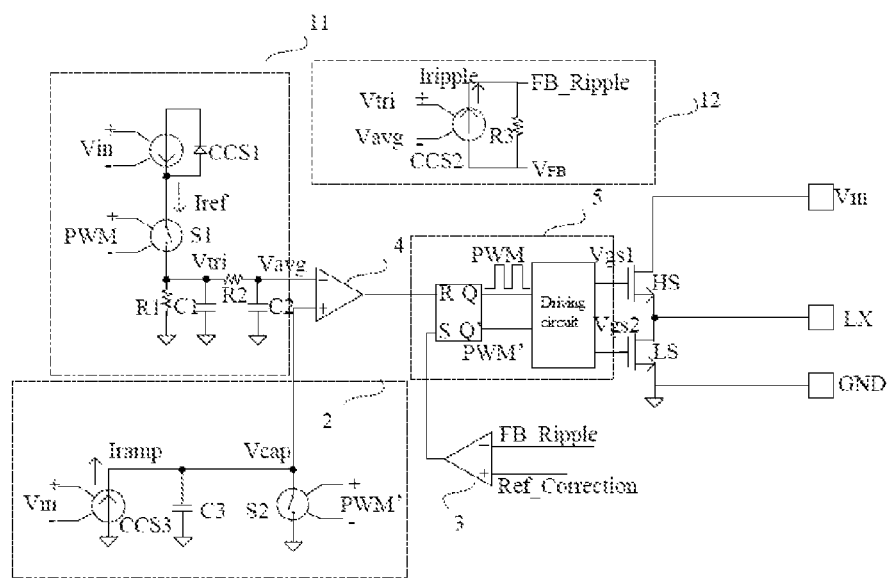
FIG. 2 is a specific diagram of a circuit for controlling a switching converter according to an embodiment of the present disclosure.

FIG. 2 shows a specific diagram of a circuit for controlling a switching converter according to an embodiment of the present disclosure. As can be seen from FIG. 2, the reference-signal generation circuit 11 includes a first controlled current source CCS1, a first switch S1, a first resistor R1, a first capacitor C1, a second resistor R2, and a second capacitor C2. The first controlled current source CCS1 is configured to generate a current Iref that is in a first proportion k1 to the input voltage Vin (i.e., Iref=k1*Vin), under control of the input voltage Vin. The first switch S1 is connected in series with the first controlled current source CCS1. The first switch S1 is turned between on and off under control of the pulse signal PWM. The pulse signal PWM is same as a driving signal of the main power switch. The first resistor R1 and the first capacitor C1 are connected in parallel between the first switch S1 and a ground reference, to form a first-stage RC filter circuit. In a case that the first switch S1 is on, the first capacitor C1 is charged by the current Iref. In a case that the first switch S1 is off, the first capacitor C1 is discharged via the first resistor R1. A time constant of the first-stage RC filter circuit is small, and thus the triangular wave signal Vtri is formed on the first capacitor C1. The second resistor R2 and the second capacitor C2 are connected in series between a common terminal of the first capacitor C1 and the first switch S1 and the ground reference to form a second-stage RC filter circuit. A time constant of the second-stage RC filter circuit is large, and the triangular wave signal Vtri is filtered to form the reference signal Vavg. It can be obtained that the reference signal is Vavg=Iref*D*R1, where D is a duty cycle of the main power switch HS.

Referring to FIG. 2, the Ripple superimposition circuit 12 includes a second controlled current source CCS2 and a third resistor R3. The second controlled current source CCS2 is configured to output a ripple current Iripple under control of a difference between the triangular wave signal Vtri and the reference signal Vavg, in which Iripple=a*(Vtri−Vavg). The ripple current Iripple is converted into the ripple signal Ripple via the third resistor, such that the ripple signal Ripple can be superimposed on the feedback signal $V_{FB}$. The feedback signal $V_{FB}$ is connected to a first terminal of the third resistor, and the first signal FB_Ripple is generated at a second terminal of the third resistor. Namely, there is FB_Ripple=$V_{FB}$+Ripple.

As shown in FIG. 2, the ramp signal generation circuit 2 includes a third controlled current source CCS3, a second switch S2, and a third capacitor C3. The third controlled current source CCS3 is configured to generate a current Iramp that is in a second proportion k2 to the input voltage Vin (i.e., Iramp=k2*Vin), under control of the input voltage Vin. The third controlled current source CCS3, the second switch S2 and the third capacitor C3 are connected in parallel to the ground reference. The second switch S2 is turned between on and off under control of the pulse signal PWM'. The pulse signal PWM' is opposite in logic to the driving signal of the main power switch. In a case that the second switch S2 is off, the third capacitor C3 is charged by the current Iramp. In a case that the second switch S2 is on, the third capacitor C3 is instantaneously fully discharged. Thereby, the ramp signal Vcap is generated. It should be appreciated that the ramp generation circuit may be in other circuit forms to generate the ramp signal correlated with the on-off state of the main power switch.

A peak of the ramp signal Vcap is equal to Iramp*Ton/C3. Ton is turn-on duration of the main power switch HS and satisfies Ton=D*T, and T is a switching period. The following equation can be obtained from that the peak of the ramp signal Vcap is equal to the reference signal Vavg.

$$Vavg = Iref*D*R1 = Iramp*D*T/C3 \quad (1)$$

There are Iref=k1*Vin and Iramp=k2*Vin, and thus it can be obtained that the switching period T satisfies a following condition.

$$T = R1*C3*k1/k2 \quad (2)$$

It can be seen from equation (2) that the switching period T is independent from the input voltage Vin and the duty cycle D. Namely, the method keeps a switching frequency constant in response to variations of the input voltage Vin and the duty cycle D.

Figure 3:
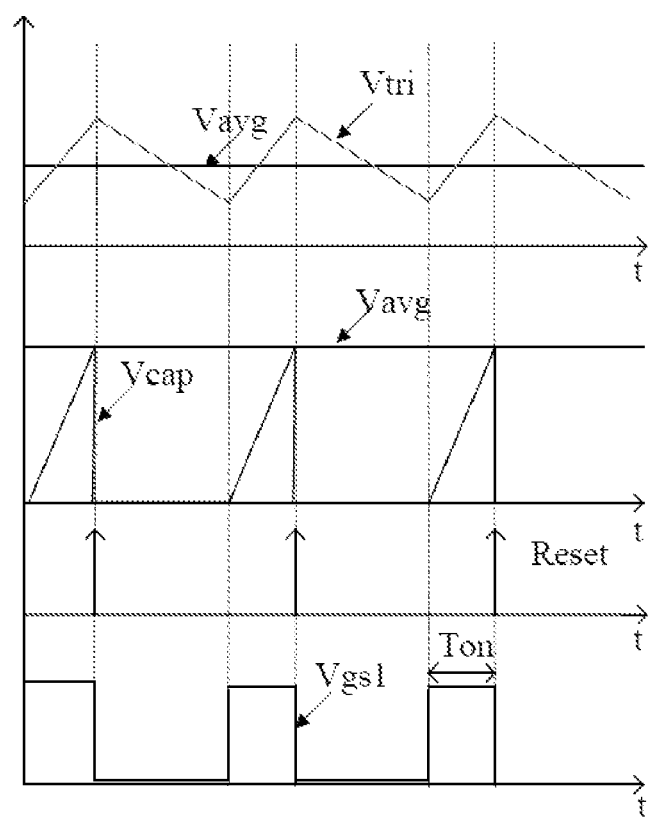
FIG. 3 is a waveform diagram of on-time control of a switching converter in response to a constant input voltage according to an embodiment of the present disclosure.

FIG. 3 is a waveform diagram in operation of a switching converter in response to a constant input voltage according to an embodiment of the present disclosure. As can be seen from FIG. 3, the reference signal Vavg is an average of the triangular wave signal Vtri. In a case that the ramp signal Vcap is equal to the reference signal Vavg, the output terminal of the second comparator 4 generates a reset signal Reset, and thus the main power switch HS is switched off and the synchronous power switch LS is switched on. Namely, the driving signal Vgs1 is used to drive the main power switch HS. The driving signal Vgs2, which is the complementary signal of the driving signal Vgs1, is used to drive the synchronous power switch LS.

Figure 4:
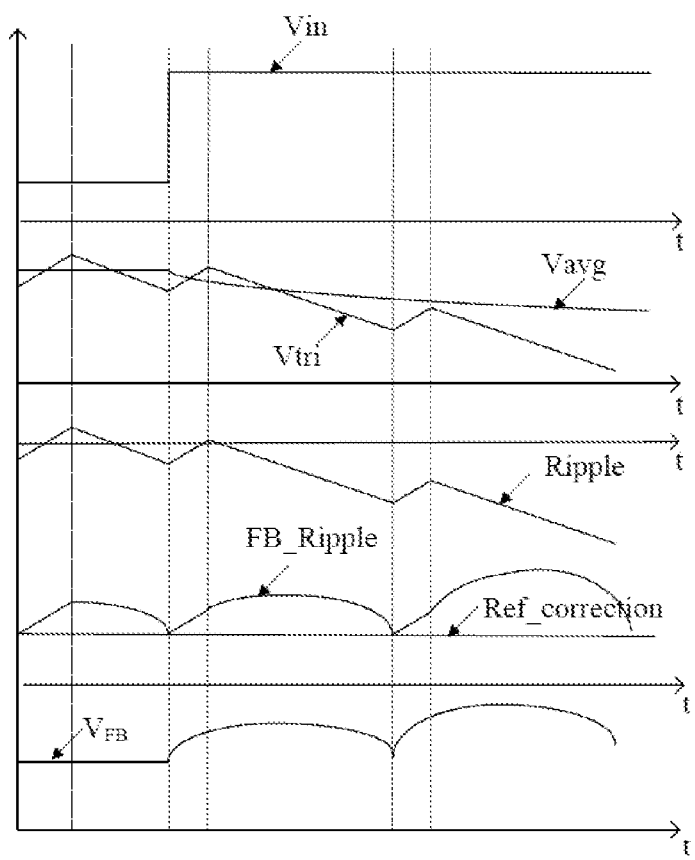
FIG. 4 is a waveform diagram of ripple control of a switching converter in response to an abrupt rise of an input voltage in conventional technology.

FIG. 4 is a waveform diagram of ripple control of a switching converter in response to an abrupt rise of an input voltage in conventional technology. In conventional technology, the current Iref and the current Iramp are generated by a fixed current source. Thereby in a case that the input voltage Vin increases instantaneously, the current Iref and the current Iramp do not change, and thus the turn-on duration Ton does not change instantaneously. The output voltage overshoots due to the increased input voltage Vin. The closed-loop response of the feedback signal FB is slow, and the feedback signal $V_{FB}$ increases. A valley of the ripple signal Ripple needs to be smaller than an original value, so as to enable the main power switch HS to be switched on. Thus, turn-off duration Toff of the main power switch increases, so that the switching period T increases and the duty cycle decreases, resulting in a gradual decrease of the triangular wave signal Vtri. Since the time constant of the second-stage RC filter circuit is large, the reference signal Vavg cannot follow the change of the triangular wave signal Vtri at the instant when the input voltage jumps, thereby lagging behind the triangular wave signal Vtri. It can be seen from FIG. 4 that the reference signal Vavg is greater than the average of the triangular wave signal Vtri. Eventually, the ripple signal Ripple obtained by subtracting the reference signal Vavg from the triangular wave signal Vtri is negative. Since the ripple signal Ripple is superimposed on the feedback signal $V_{FB}$ before comparison with the referential signal Ref_correction, the feedback signal $V_{FB}$ becomes higher to offset the negative value of the ripple signal. Thereby, overshoot of the output voltage is aggravated. Similarly, a drop of the output voltage is aggravated by the ripple signal Ripple in case of an abrupt decrease of the input voltage Vin.

Figure 5A:
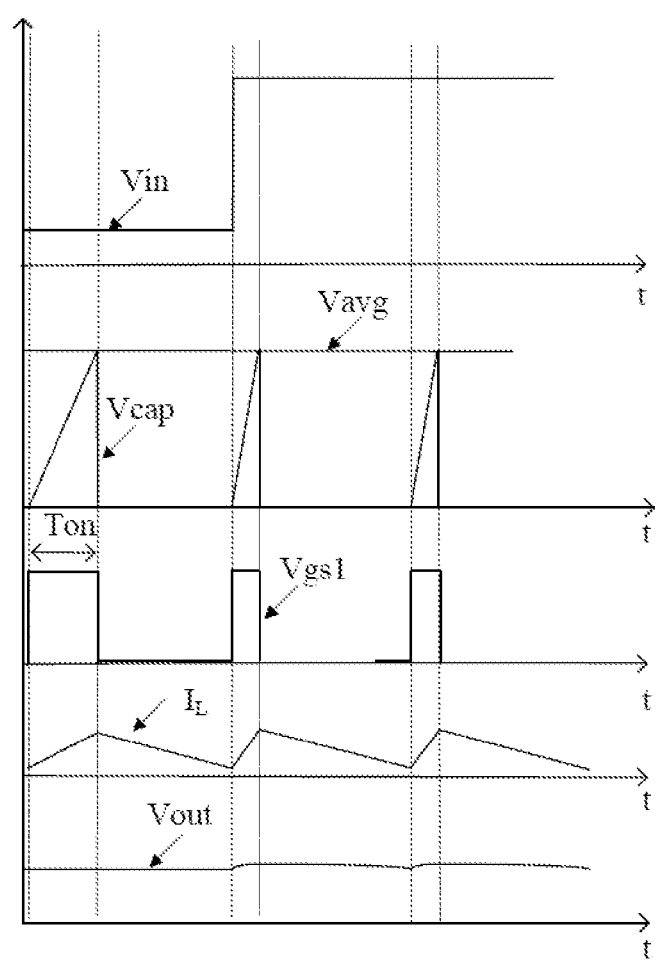
FIG. 5a is a waveform diagram of on-time control of a switching converter in response to an abrupt rise of an input voltage according to an embodiment of the present disclosure.

FIG. 5a shows a waveform diagram in operation of a switching converter in response to an abrupt increase of an input voltage according to an embodiment of the present disclosure. It can be seen from FIG. 5a that, in a case that the input voltage Vin increases instantaneously, a rising rate of the ramp signal Vcap increases rapidly because the current Iramp for charging the third capacitor C3 follows the increase of the input voltage Vin. Thereby, duration for reaching the reference signal Vavg becomes shorter, so that an active duration of the driving signal Vgs1 is reduced. Namely, the turn-on duration Ton is rapidly decreased. Correspondingly, a rising slope of the inductor current $I_L$ is increased, and a rising time is decreased. Since the switching period T does not change, a falling duration of the inductor current $I_L$ increases, and the duty cycle D decreases. Eventually, the output voltage Vout is kept substantially unchanged and free of an overshoot.

Figure 5B:
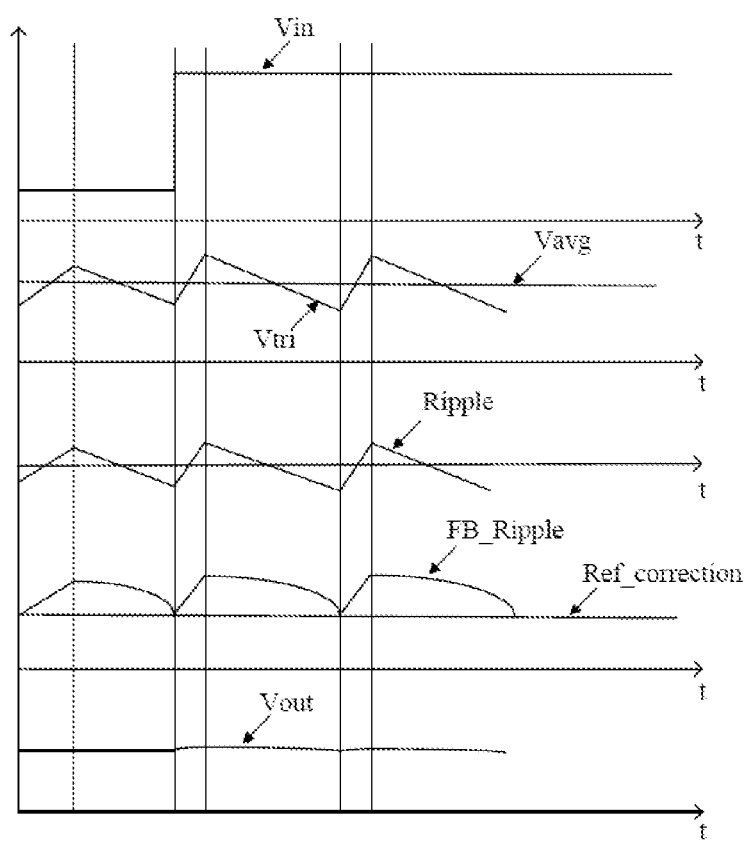
FIG. 5b is a waveform diagram of ripple control of a switching converter in response to an abrupt rise of an input voltage according to an embodiment of the present disclosure.

FIG. 5b further shows a waveform diagram of ripple control of a switching converter in response to an abrupt increase of an input voltage according to an embodiment of the present disclosure. As can be seen from FIG. 5b, in a case that the input voltage Vin increases instantaneously, the current Iref increases as the input voltage Vin increases, and hence a rising slope of the triangular wave signal Vtri increases. As described above, the turn-on duration Ton and the duty cycle D decrease in such case, so that the average of the triangular wave signal Vtri is substantially unchanged. Since there is a second-stage RC filter, the reference signal Vavg does not change, so that the ripple signal Ripple can timely reflect the ripple of the inductor current $I_L$. The ripple signal Ripple is superimposed on the feedback signal to form the first signal FB_Ripple, which is compared with the referential signal Ref_correction, and the set signal Set is outputted to switch on the main power switch. Thereby, the output voltage Vout is kept stable without large overshoot. On the other hand, the reference signal is Vavg=k1*Vin*R1*D=k1*Vout*R1. Since the reference signal Vavg does not change, the output voltage Vout also does not change substantially. Similarly, the output voltage Vout also does not drop substantially in case of an abrupt decrease of the input voltage Vin.

In view of the above, according to the embodiment of the present disclosure, the ripple signal is generated based on the input voltage and the on-off state of the power switch in the switching converter, and the ripple signal is superimposed on the feedback signal of the output voltage, to perform the closed-loop control of the output voltage. It is achived that the switching converter can respond quickly to changes in the input voltage while ensuring that the switching frequency is kept constant. A dynamic performance of the system is improved.

The present disclosure only takes the bucking topology as an example for illustration. Those skilled in the art should appreciate that the control circuit may also be applied to other switching converters that include a power stage circuit including at least one power switch.

Described above are only preferable embodiments of the present disclosure, and the present disclosure are not limited thereto. Those skilled in the art can make various modifications and variations to the present disclosure. Any modification, equivalent replacement, modification, or the like that is made within the spirit and principle of the present disclosure should fall within the protection scope of the present disclosure.

The invention claimed is:

1. A circuit for controlling a switching converter, comprising a ripple generation circuit and a ramp generation circuit, wherein
    the ramp generation circuit is configured to generate a ramp signal correlated with an input voltage and an on-off state of a power switch;
    the ripple generation circuit comprises:
    a reference-signal generation circuit configured to generate a triangular wave signal and a reference signal based on the input voltage and the on-off state of the power switch, wherein the reference signal is compared with the ramp signal to control turn-on duration of the power switch in a switching period; and
    a ripple superimposition circuit configured to generate a ripple signal based on the triangular wave signal and the reference signal to adjust a duty cycle of the power switch in response to a change of the input voltage,
    wherein the ripple superimposition circuit comprises:
    a second controlled current source, under control of a difference between the triangular wave signal and the reference signal; and
    a third resistor, connected in parallel with the second controlled current source to generate the ripple signal, wherein a first terminal of the third resistor is connected to a feedback signal, and a second terminal of the third resistor generates a first signal by superimposing the ripple signal and the feedback signal.

2. The circuit according to claim 1, wherein the turn-on duration of the power switch is adjusted in response to the change of the input voltage.

3. The circuit according to claim 1, the duty cycle is adjusted in accordance with a sum of the ripple signal and the feedback signal, wherein the feedback signal represents an output voltage of the switching converter.

4. The circuit according to claim 1, wherein the reference-signal generation circuit comprises:
    a first controlled current source, configured to generate, under control of the input voltage of the switching converter, a first controlled current in a first proportion to the input voltage;
    a first switch, of which a control terminal receives a first pulse signal, wherein the first pulse signal is determined based on the on-off state of the power switch;
    a first filter circuit, configured to generate the triangular wave signal based on an on-off state of the first switch and the first controlled current; and
    a second filter circuit, configured to generate the reference signal based on the triangular wave signal.

5. The circuit according to claim 1, wherein a change speed of the triangular wave signal is greater than a change speed of the reference signal, in response to the change of the input voltage.

6. The circuit according to claim 4, wherein the first switch is connected in series between the first controlled current source and the first filter circuit.

7. The circuit according to claim 4, wherein the first filter circuit comprises a first resistor and a first capacitor that are connected in parallel between the first switch and a ground reference.

8. The circuit according to claim 4, wherein the second filter circuit comprises a second resistor and a second capacitor, wherein a first terminal of the second resistor is connected to a common terminal of a first capacitor and the first switch, and a second terminal of the second resistor is connected to a ground reference via the second capacitor in series.

9. The circuit according to claim 1, wherein the ramp generation circuit comprises:
a third controlled current source, configured to generate, under control of the input voltage, a second controlled current in a second proportion to the input voltage;
a third capacitor, connected in parallel with the second controlled current source to a ground reference; and
a second switch, connected in parallel with the third capacitor, wherein a control terminal of the second switch receives a second pulse signal, and the second pulse signal is determined based on the on-off state of the power switch.

10. The circuit according to claim 1, further comprising:
a first comparator, wherein
a first terminal of the first comparator receives the first signal, a second terminal of the first comparator receives a referential signal, and the first comparator generates a set signal to switch on the power switch.

11. The circuit according to claim 1, wherein further comprising:
a second comparator, configured to generate a reset signal based on the reference signal and the ramp signal, to control switching-off of the power switch.

12. A switching converter, comprising:
a power stage circuit, comprising at least one power switch;
a ramp generation circuit, configured to generate a ramp signal correlated with an input voltage and an on-off state of a power switch; and
a ripple generation circuit comprising a reference-signal generation circuit and a ripple superimposition circuit, wherein:
the reference-signal generation circuit is configured to generate a triangular wave signal and a reference signal based on the input voltage and the on-off state of the power switch,
the reference signal is compared with the ramp signal to control turn-on duration of the power switch in a switching period, and
the ripple superimposition circuit is configured to generate a ripple signal based on the triangular wave signal and the reference signal to adjust a duty cycle of the power switch in response to a change of the input voltage,
wherein the ripple superimposition circuit comprises:
a second controlled current source, under control of a difference between the triangular wave signal and the reference signal; and
a third resistor, connected in parallel with the second controlled current source to generate the ripple signal, wherein a first terminal of the third resistor is connected to a feedback signal, and a second terminal of the third resistor generates a first signal by superimposing the ripple signal and the feedback signal.

13. The switching converter according to claim 12, the duty cycle is adjusted in accordance with a sum of the ripple signal and the feedback signal, wherein the feedback signal represents an output voltage of the switching converter.

14. A method for controlling a switching converter, comprising:
generating a triangular wave signal and a reference signal based on an input voltage of the switching converter and an on-off state of a power switch of the switching converter;
generating a ripple signal based on the triangular wave signal and the reference signal; and
superimposing the ripple signal and a feedback signal of an output voltage to generate a first control signal, for controlling the switching converter and increasing a dynamic response speed in response to a change of the input voltage, wherein generating the ripple signal based on the triangular wave signal and the reference signal comprises:
controlling a current source based on a difference between the triangular wave signal and the reference signal, to generate a ripple current; and
converting the ripple current into the ripple signal.

15. The method according to claim 14, further comprising:
generating a ramp signal based on the input voltage and the on-off state of the power switch;
comparing the ramp signal with the reference signal to generate a reset signal for controlling switching-off of the power switch; and
comparing a first signal with a referential signal to generate a set signal for controlling switching-on of the power switch.

* * * * *